United States Patent
Dayen et al.

(10) Patent No.: US 7,685,469 B2
(45) Date of Patent: Mar. 23, 2010

(54) METHOD AND APPARATUS OF ANALYZING COMPUTER SYSTEM INTERRUPTIONS

(75) Inventors: Anna Dayen, Redmond, WA (US); Heidi A. Crittenden, Bellevue, WA (US); Mario R. Garzia, Redmond, WA (US); Peng Li, Redmond, WA (US); Mujtaba Khambatti, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 11/112,603

(22) Filed: Apr. 22, 2005

(65) Prior Publication Data

US 2006/0242467 A1     Oct. 26, 2006

(51) Int. Cl.
*G06F 11/00* (2006.01)
(52) U.S. Cl. .................................. 714/38; 702/182
(58) Field of Classification Search .................. 714/38, 714/48, 57
See application file for complete search history.

(56) References Cited

U.S. PATENT DOCUMENTS

| | | | | |
|---|---|---|---|---|
| 5,881,222 | A * | 3/1999 | Berry et al. | 714/47 |
| 6,266,788 | B1 * | 7/2001 | Othmer et al. | 714/38 |
| 6,829,564 | B2 * | 12/2004 | Tanaka et al. | 702/182 |
| 7,010,465 | B2 * | 3/2006 | Butt et al. | 702/186 |
| 7,231,550 | B1 * | 6/2007 | McGuire et al. | 714/26 |
| 2004/0024865 | A1 * | 2/2004 | Huang et al. | 709/224 |
| 2004/0153823 | A1 * | 8/2004 | Ansari | 714/38 |
| 2004/0153835 | A1 * | 8/2004 | Song et al. | 714/38 |
| 2004/0230953 | A1 * | 11/2004 | Garzia et al. | 717/124 |

OTHER PUBLICATIONS

M. Kalyanakrishnam, Z. Kalbarczyk, R. Iyer, "Failure Data Analysis of a LAN of Windows NT Based Computers". Proceedings of the 18th IEEE Symposium on Reliable Distributed Systems, 1999.*

* cited by examiner

*Primary Examiner*—Gabriel L Chu
(74) *Attorney, Agent, or Firm*—Marshall, Gerstein & Borun LLP

(57) ABSTRACT

A method of analyzing a computer application interruption may analyze a cause of the computer application interruption, determine whether the cause of the computer application interruption was user disruptive or non-user-disruptive, determine whether the cause of the computer application interruption was operating system related or non-operating system related and determine whether the computer application interruption caused the computer application to stop operating or operate at a degraded level of performance.

1 Claim, 3 Drawing Sheets

METHOD AND APPARATUS OF ANALYZING COMPUTER SYSTEM INTERRUPTIONS

BACKGROUND

When a person buys a car, they have an expectation that not only will the car perform reliably as advertised, but also that they will not be required to constantly bring their car into the shop for proactive maintenance in order to ensure the advertised high level of reliability. The loss of time caused by these frequent trips to the shop impacts the customer perception of reliability. They would have preferred to use that time on more desirable activities, such as a road trip.

Similarly, for customers purchasing computers, there is an expectation of not needing to constantly add patches and installations that require the rebooting of their system. The interruption and time from their intended activities, such as completing a word document or playing a game detracts from their experience. The time it takes to shut the system down and bring it back up lowers the customer's perceived reliability of their system.

The key in understanding software reliability and being able to objectively measure the reliability and availability of a customer's software system is the ability to define, detect, and isolate user disruptions. The ability to clearly define and identify these disruptions at the application, process, service, driver and OS level brings software creators closer to being able to better understand customer disruption and dissatisfaction; and hence, better understand their perception of system reliability and availability.

Once these user disruptions are programmatically defined and identified, a time/state model can be used to partition the downtime into its disruptive and non-disruptive parts. From these partitions, reliability metrics can be calculated based on disruptive downtimes, better isolating the reliability issues of a customer's system.

SUMMARY

A method of analyzing a computer user interruption is disclosed. The method may analyze a cause of the computer application interruption, determine whether the cause of the computer application interruption was a non-disruptive or disruptive, determine whether the cause of the computer application interruption was operating system related or non-operating system related and determine whether the computer application interruption caused the computer application to stop operating or operate at a degraded level of performance. A computer readable medium with computer executable instructions to execute the method and a computer system with a processor programmed to execute the method also are disclosed.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
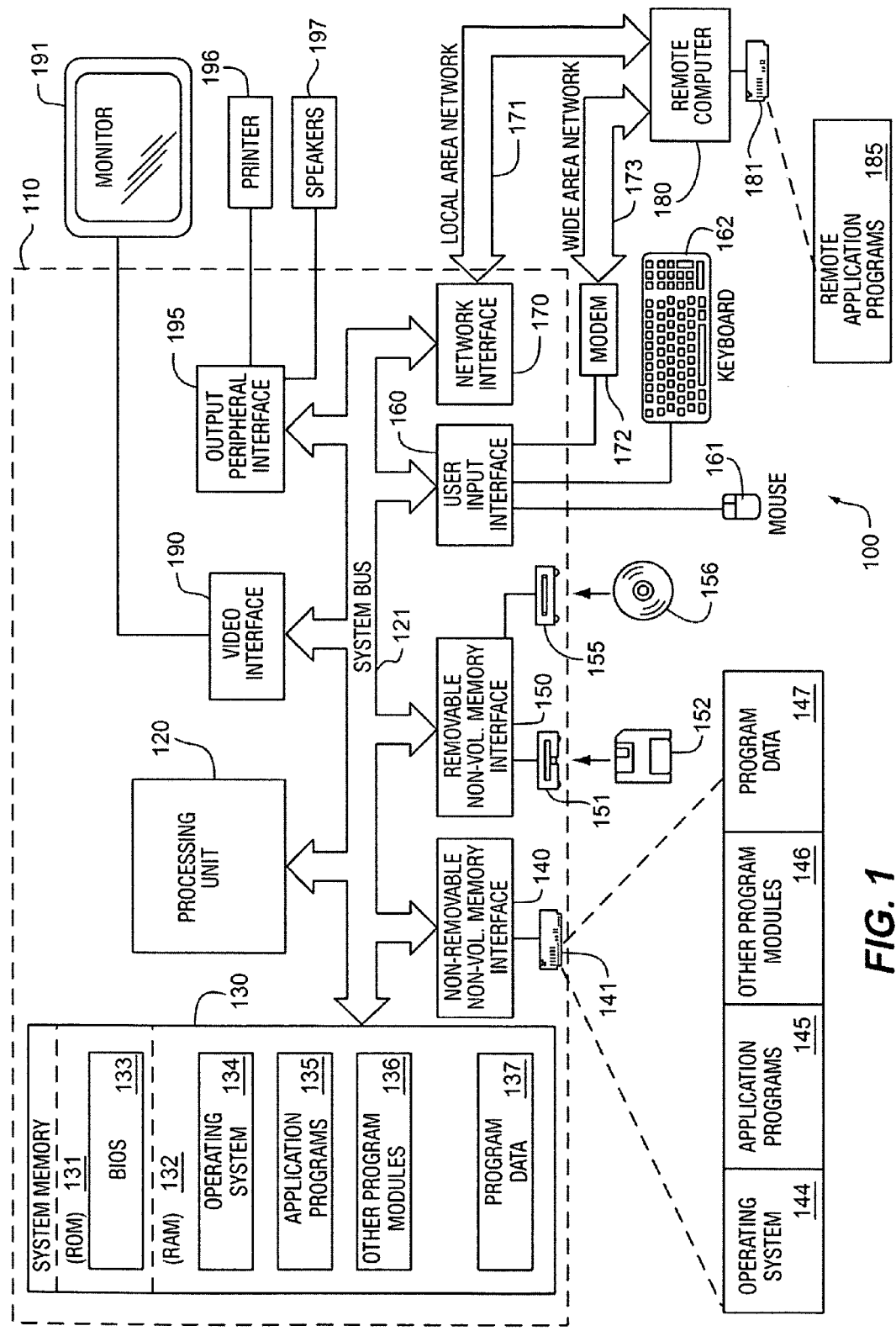
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
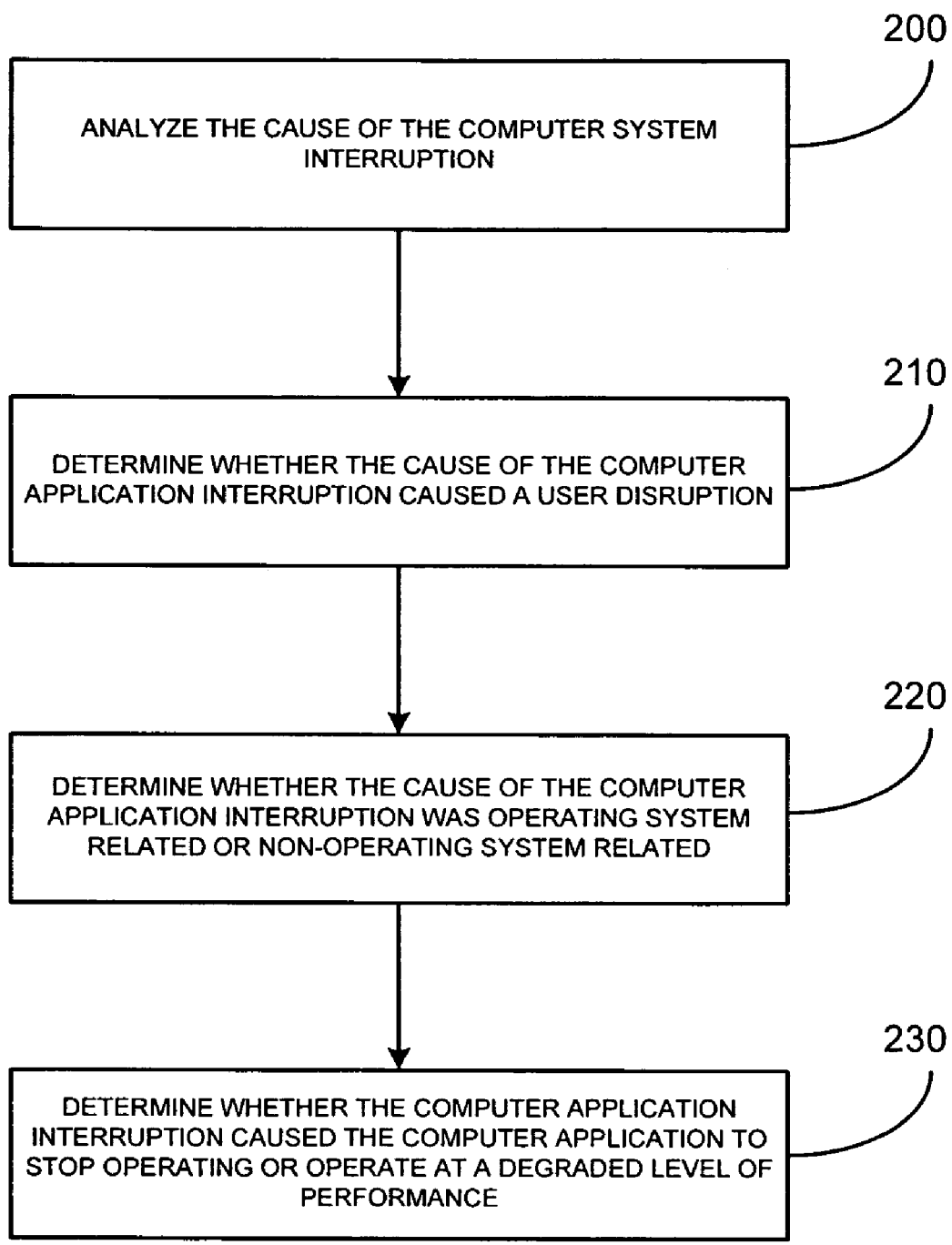
FIG. 2 is a flowchart in accordance with the claims.

FIG. 2 may be an illustration of a flowchart of a method in accordance with the claims. The method may analyze a computer application interruption to better gauge the amount of time that a user is prevented from using a computer in their intended way. A computer application may be a particular program or the entire operating system. In order to better understand and improve the level of reliability, as discussed earlier, it is important to know why the application interruption is taking place. Logged events may provide information on the reason for some of the computer's shutdowns, but there are many times that the application is shutdown with no additional information on why it took place.

At block 200, the method may analyze the cause of a computer application interruption. A user disruption may be anything that disrupts an intended activity on the system. Today, reliability and availability tools focus on isolating failures and other reasons for unplanned shutdowns of the application but ignore all other types of user disruptions, such as planned software updates.

At block 210, the method may determine whether the cause of the computer application interruption was disruptive or non-disruptive. A non-disruptive interruption may be a shutdown that does not keep a user from using a computer in the manner they intended. For example, shutting down a computer to go home after work is not a disruptive shutdown. Disruptive shutdowns may be caused by unexpected occurrences or failures such as crashes, hangs, power outage, etc., as well as situations where a user decides to interrupt their work (shut the application down) in order to stop the application's erratic behavior.

At block 220, the method may also determine whether the cause of the computer application interruption was operating system related or non-operating system ("OS") related. OS disruptions may be disruptions that affect an OS component such as an OS upgrade or application hang. Non-OS disruptions may be disruptions that are caused by or affect components that do not ship on the OS CD, such as a hardware installation or an application crash.

At block 230, the method may determine whether the computer application interruption caused a user disruption in terms of a degraded level of performance. Interruptions that make the computer or particular application stop operating may be called hard interruptions and interruptions that degrade the level of computer or application performance may be soft interruptions.

HARD DISRUPTIONS

Hard disruptions may be disruptions that cause the system, application, or service to shutdown or hang or otherwise become unusable when user wants to continue working. For example, OS crashes and OS reboots may be hard disruptions with respect to the OS. All hard disruptions may result in a shutdown of the system, application, or service even if this is only to shutdown and restart the application for something such as a patch install to the OS. An application crash may be considered a hard disruption with respect to the application even though the OS may have continued to running.

For the purpose of assigning a cause for a hard user disruption the following sub-levels of granularity may be defined for hard disruptions.

1. Immediate—These may be events that are certain to have caused the application to shutdown immediately such as a crash or power outage.

2. Deferrable—These may be events that are certain to have caused a shutdown, but not immediately such as a patch or application install that require a shutdown or may be deferred for some time.

3. Unnecessary—These may be actions that do not require the user to shutdown but occurred around the time of the shutdown and are potential causes for the shutdown. For example, these may be actions that historically required the user to reboot/restart the application, but no longer do, such as a patch install or application install that does not require a shutdown.

The above sub-levels of hard disruptions may be state dependent, that is to say, depending on the state of the application, some users may be required to immediately shutdown the application after certain events where as other users may not need to shutdown their application at all.

Hard user disruption for the client may be detected in a variety of ways. The following may be some examples:

a. All dirty shutdowns (system 6008 events in the event log) may be defined as user disruptions.

b. Well understood events seen within defined intervals of time around a shutdown may define the shutdown as disruptive. An example of this may be an OS Service Pack install event within Y minutes of a shutdown.

c. All downtime periods that occur for a short period (such as 20 minutes or less) may be identified as times the user really intended to continue using their applications and are defined as disruptive downtimes.

Classification of Potential Cause for the Hard User Disruption

In classifying potential causes for the hard disruption, there may be multiple culprits that are suspected to have caused the shutdown. Additionally, there may not be enough information to give one cause more credence than another. As a consequence in this case, the method may identify all events that may have potentially caused the disruption. The methodology for identifying the potential causes of a shutdown may be as follows with the following priority given for the potential cause of the hard disruption.

1. "Immediate hard disruption" events always take first priority as the cause for the disruption. If multiple "immediate hard disruption" occur, they each take equal proportion as the cause of the shutdown.

2. "Deferrable hard disruption" events take second priority as the cause for the disruption. If multiple "deferrable hard disruption" occur, they each take equal proportion as the cause of the shutdown.

3. "Unnecessary hard disruption" events take third priority as the cause for disruption. If multiple "unnecessary hard disruption" occur, they each take equal proportion as the cause of the shutdown.

4. If there are no events that fall into the above categories (correlated events or Shutdown Event Tracker ("SET") information for servers), the cause for the disruption is assigned as "UNKNOWN".

The following may be some examples of how the method may classify some causes of user disruptions.

| Planned vs. unplanned | Classification | level | Event Log | Event Source | Event ID | Description | Client or Svr |
|---|---|---|---|---|---|---|---|
| Planned due to non-OS | App: Install/ Maintenance | 2 | Application | MsiInstaller | 1005 | The Windows Installer initiated a system restart to complete or continue the configuration of application installer package. | Both |

-continued

| Planned vs. unplanned | Classification | level | Event Log | Event Source | Event ID | Description | Client or Svr |
|---|---|---|---|---|---|---|---|
| Planned due to the OS | OS Upgrade/ Sp/Hotfix | 3 | System | Automatic Updates | 21 | An update via Windows Update was installed and a restart of the computer was required for the update to take effect. The user chose to defer the restart to a later time. | Both |
| Unplanned due to non-OS | Hardware: failure | 3 | System | Disk | 52 | The driver has detected that device %1 has predicted that it will fail. Immediately back up your data and replace your hard disk drive. A failure may be imminent. | Both |
| Unplanned due to the OS | System failure: stop error/boot failure | 1 | System | Save Dump | 1006 | An OS Crash occurred on the computer. A physical memory dump was not saved, and the bug number is unknown. | Both |

SOFT DISRUPTIONS

Soft disruptions may be disruptions where the application is still able to execute but is demonstrating some problems, such as degraded performance, partial functionality loss, data loss, wrong functionality, etc. Soft user disruptions may be anything that deviates from the specified functionality.

Affects the whole application—these may be soft disruptions that are affecting use for the complete application, for example degrading performance.

Partial functional loss—these may be soft disruptions that hinder the user's ability to perform certain tasks on the application, but may allow the user to be uninterrupted when doing other tasks on the application.

CLASSIFICATION OF SOFT USER DISRUPTIONS

As soft user disruptions are not associated with a start or stop event of the system or application (depending on the perspective), the classification for the soft user disruption may be the event that identified the soft user disruption. For example, if the perspective being considered is the OS and the user experiences five application hang events with no OS shutdowns and two performance degradation events, the user may have experienced seven soft user disruptions with respect to the OS. Five of these soft user disruptions with respect to the OS may have been caused by application hangs and two by performance degradation. There may be the following categories for soft user disruptions.

Application/Service unstable—application/service failures that may not result in the user cycling or rebooting the OS such as application hangs or crashes.

Hardware failures—degradation or failures to specific hardware components that may not result in rebooting of the OS such as predicted disk drive failure event.

Performance—degradation or a noticeable decline in the performance of the OS, application, service, or process such as resource exhaustion events not requiring reboot or performance events.

Network connectivity issues—failure to connect to network resources and perceived loss of network connectivity e.g. terminal server session breaks connection temporarily while in use.

Usability—anything that deviates from current usability practices such as pop-up windows or error dialogs.

Functionality—anything that deviates from specified functionality of the feature or deviates from functionality practices in the operating system or application.

Below are listed some events that may be considered soft disruptions. As mentioned earlier some soft user disruptions may become so disruptive that they become hard user disruptions and the user decides to reboot the application. Events that are marked as soft user disruptions may not also be marked as hard user disruptions.

| Planned vs. unplanned | Classification | Event Log | Event Source | Event ID | Description | Client or Svr |
| --- | --- | --- | --- | --- | --- | --- |
| Unplanned due to non-OS | Hardware: failure | System | Disk | 52 | The driver has detected that device %1 has predicted that it will fail. Immediately back up your data and replace your hard disk drive. A failure may be imminent. | Both |
| Unplanned due to non-OS | Hardware: failure | System | NTFS | 55 | The file system structure on the disk is corrupt and unusable. Please run the chkdsk utility on the volume %2. | Both |

Figure 3:
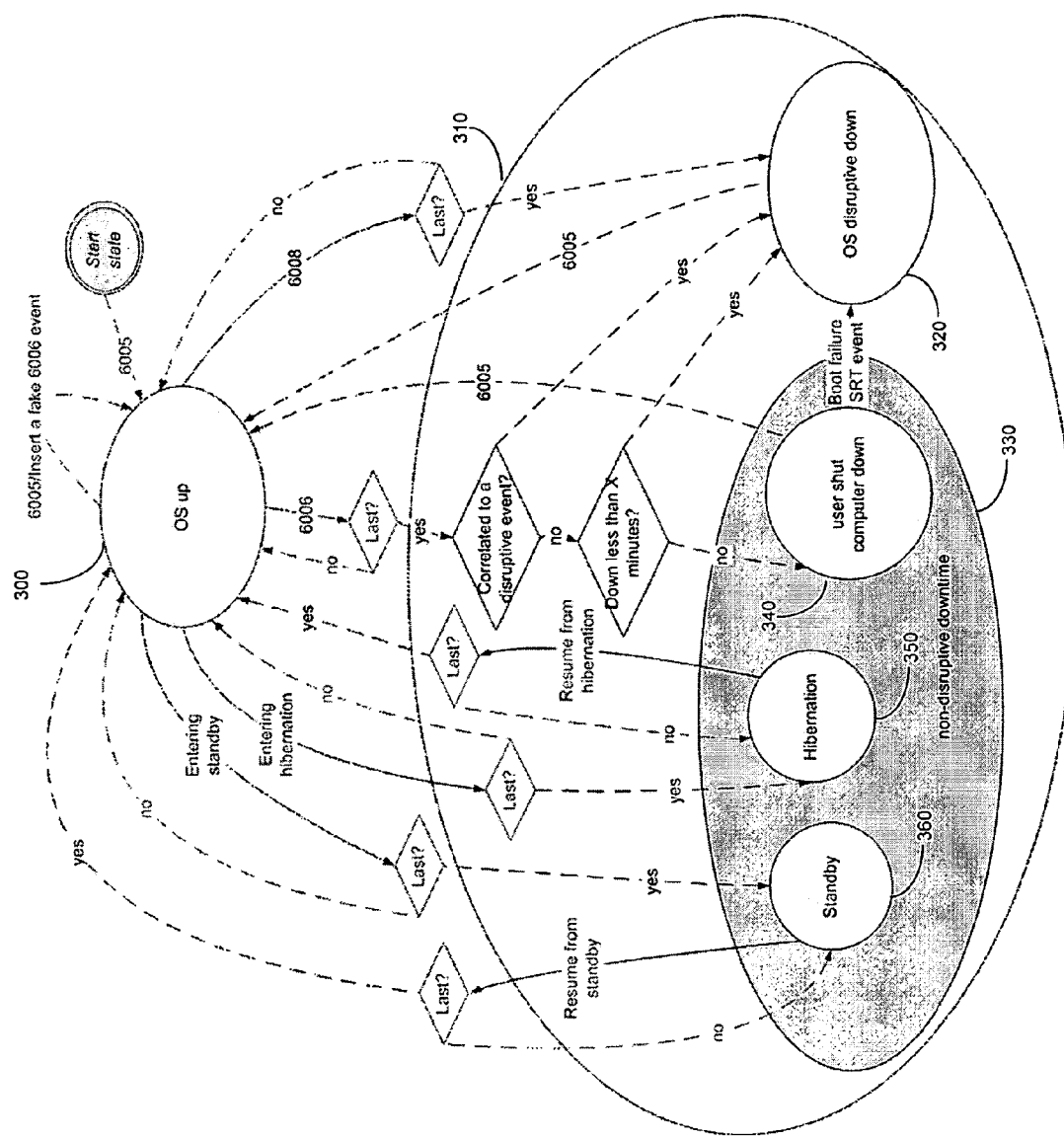
FIG. 3 is an illustration of possible user disruptions.

FIG. 3 may be a graphical illustration of how an application may fluctuate between no disruptions to hard or soft disruption. While this example may focus on OS disruptions, the perspective could just as easily focus on individual applications At block 300, the OS may be up. The sphere 310 may be a set of states and sphere 310 may include disruptions. Events in sphere 320 may be OS disruptions that result in the OS being down or not functioning. The sphere 330 may result from events that are disruptions but may be classified as non-disruptive downtimes. Examples of non-disruptive downtimes may include user shut downs 340, hibernation of the computer 350 and standby of the computer 360.

As an example, logging in Windows servers allows the detection of the transitions between up and down OS states. Each time the OS starts up it may log a 6005 event into the system log signaling that the system is available for use, and when the OS is shut down in an orderly fashion it logs a 6006 event to signal that the OS is going down. If the OS is shut down in an abrupt manner, e.g. power loss or crash, then when it comes back up it may log a 6008 event (with a timestamp that approximates the time of the abrupt shutdown). All of these events contain time-stamps which may be used to determine the amount of time the system was down and the amount of time the system was up. With these events, OS uptime and downtime may be defined for a specific period of time.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer-implemented method of objectively measuring the reliability of an application implemented on a user's computer as well as the availability of the application to a user, the method comprising the steps of:

determining if an interruption occurs with respect to an application in use on the computer;

if an interruption has occurred, then determining if the interruption disrupts a user's interaction with the application;

if a disruption has occurred, then determining if the disruption causes the application to be unusable or causes degradation to the entire computer or causes degradation of partial functions thereof;

if the disruption causes the application to be unusable, then assigning one of a plurality of different classifications to the disruption, the classifications of disruptions that causes the application to be unusable comprise a first priority comprising immediate application shutdowns, a second priority comprising deferrable application shutdowns, a third priority comprising unnecessary application shutdowns, and a fourth priority comprising undetermined causes;

wherein disruptions that cause the application to be unusable comprise times when the computer is performing updates and downtimes that are short in duration;

if the disruption causes degradation to the entire computer or causes degradation of partial functions thereof, then assigning one of a plurality of classifications thereto;

determining whether the cause of the disruption was operating system related or non-operating system related;

analyzing each one of a plurality of other applications on the computer system separately to see if any one of the other applications caused the disruption; and collecting data regarding each disruption of the application and then calculating reliability metrics based thereon, the reliability metrics objectively quantifying a user's satisfaction with the application.

* * * * *